May 5, 1931. C. STEENSTRUP 1,804,237
COMPOSITE METAL AND BRAZING PROCESS THEREFOR
Filed Oct. 16, 1925
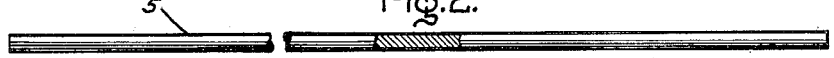
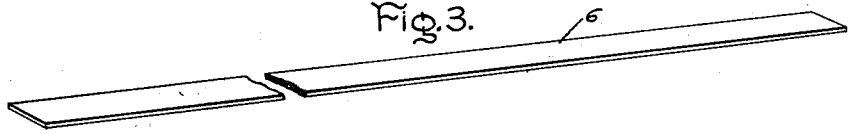
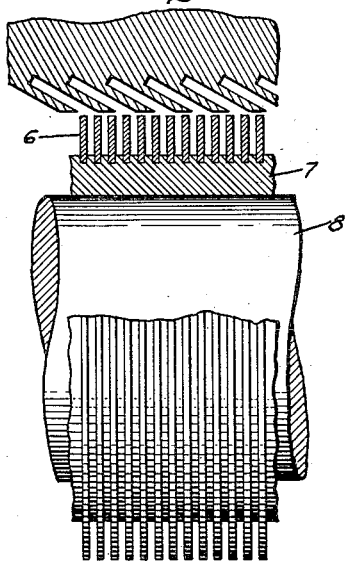
Inventor:
Christian Steenstrup,
by
His Attorney.

Patented May 5, 1931

1,804,237

UNITED STATES PATENT OFFICE

CHRISTIAN STEENSTRUP, OF SCHENECTADY, NEW YORK, ASSIGNOR TO GENERAL ELECTRIC COMPANY, A CORPORATION OF NEW YORK

COMPOSITE METAL AND BRAZING PROCESS THEREFOR

Application filed October 16, 1925. Serial No. 62,923.

My present invention relates to the joining of metal articles by fused metal, and more particularly to the joining of metal structures which ordinarily may not readily be united by means of copper brazing.

Monel metal, which is an alloy of nickel and copper, with a small percentage of other metals, such as iron and manganese, is an example of a metal structure which cannot be copper brazed without difficulty, due to the fact that in the prolonged heating in a hydrogen furnace the brazing copper has time to dissolve the nickel from the alloy making the copper sluggish and unsuitable for brazing purposes.

It is an object of my invention to provide means whereby a copper-nickel alloy, such as monel, may be copper brazed without changing materially the chemical characteristics of the brazing metal. It is a further object of my invention to provide a method for treating metal structures which are not adapted to be readily copper brazed, because of excessive or insufficient affinity of the brazing metal with the parts to be brazed or for any other reason.

The novel features which I believe to be characteristic of my invention are set forth with particularity in the appended claims. My invention itself, however, will best be understood from reference to the following specification taken in connection with the accompanying drawings in which Figs. 1, 2 and 3 show diagrammatically steps involved in carrying my invention into effect, while Fig. 4 shows a practical application of my invention as applied to the construction of steam turbines.

Referring to the drawings, I have indicated at 1 a rod of Monel metal which may be inserted into a light steel tube 2 so as to fit closely therein. The ends of tube 2 may be closed by low carbon steel plugs 3 which fit into the ends of the tube 2 and against rod 1, as clearly shown in Fig. 1. The steel plugs are welded to tube 2 in any suitable manner, as indicated at 4. The tube and rod are then heated preferably in a reducing atmosphere, as in a hydrogen furnace, to a temperature of about 1400° C. At about this temperature the Monel metal will melt, expand and become welded or fused to the surrounding steel coating. The metal structure thus formed may be copper brazed without difficulty, due to the fact that the ferrous coating will prevent any rapid or extensive diffusion of the brazing copper into the metal structure, and also will prevent modification of the brazing copper by excessive alloyage of nickel derived from the Monel metal.

Generally, it will be found necessary in the practical application of the composite metal described, to form it into flat sheets from which various articles may be constructed. In Fig. 4 I have indicated the application of my invention to the construction of packings, of the so called labyrinth type, used to prevent leakage between relatively rotating members of a steam turbine. For this purpose the composite metal shown in Fig. 1 is drawn into a wire 5 and subsequently flattened as shown at 6. The flat composite metal ribbon thus produced is approximately .02 inches thick, and may be made any width desired. Strips of this thickness will have a steel coating approximately .002 inches thick.

The strip thus formed is applied to a steel carrying member 7 mounted on the shaft 8 of a steam turbine. The strip may be applied to the carrying member in the manner shown in my prior Patents #1,498,892, 1,498,894, or in any way desired, the particular manner in which the strip may be attached to the carrying member constituting no part of my present invention. The carrying member 7 with the edgewise strip 6 thereon is then inserted in a hydrogen furnace, and brazing copper applied to the joint between the strip and carrying member. The temperature of the furnace is now raised so as to fuse the copper. Under these circumstances the molten copper will be drawn into the interstitial spaces between the abutting surfaces wetting or uniting with the parts to be joined in such a way as to form a unitary structure, the strong union formed being due to the low mutual solubility of the copper and iron.

The ferrous coating on the Monel strip employed is sufficiently thick to completely protect the brazing copper from the action of the nickel constituent of the monel, but is sufficiently thin so that the coating on the portion exposed to the action of the steam may be allowed to waste away without interfering with the operation of the apparatus.

While I have shown a ferrous coating applied to the monel in the form of a steel tube, it is obvious that this coating may be applied by other methods, as by plating. Furthermore, if desired, a small amount of copper might be applied to the surface of the Monel rod before the steel coating is applied. Addition of copper is not necessary, however, since the monel will readily adhere to the steel coating when the temperature of the former is raised to the melting point.

Although I have illustrated my invention in connection with the copper brazing of a copper nickel alloy, it is obvious that its application is not limited to use with any one alloy or metal structure. The same principles may be applied to the copper brazing of other structures such as those metal structures which copper, when in a fused condition, will not "wet", for example, chromium or its alloys. In the latter case, as in the case of Monel metal, a coating of ferrous metal would be applied to the metal structure, and thereafter brazing copper applied to the junction of the ferrous surface and the metal structure to be welded thereto.

While I have illustrated the composite metal as employed in the construction of turbine packings it is obviously not restricted to this use. Various other metal turbine structures such as diaphragms or buckets may be formed from the composite metal shown.

What I claim as new and desire to secure by Letters Patent of the United States is:—

1. The method of preparing a metal structure for copper brazing, said structure being adapted to modify or prevent the action of brazing copper thereon, which comprises inserting the structure in a steel casing, welding said casing to the structure, and forming the structure into a relatively thin ribbon.

2. The method of preparing a metallic structure for copper brazing, which comprises applying a ferrous coating to the metal structure, welding said coating to the structure and forming said stucture into a relatively thin metallic ribbon.

3. A composite metal, comprising an alloy, one of the ingredients of which is readily dissolved out by molten copper, and a ferrous coating on the alloy, said coating substantially surrounding the alloy and being welded thereto.

4. In combination, a pair of metallic structures, one of said structures comprising a nickel-copper alloy provided with a ferrous coating and a copper film between said ferrous coated surface and said other structure.

5. The method of brazing a pair of metallic structures, one of which is adapted to prevent or modify the action of the brazing material which comprises coating the last mentioned metallic structure with a ferrous metal, welding the ferrous metal to said structure, forming the coated structure into a relatively thin elongated ribbon and brazing the ribbon to the other of said structures.

6. The method of brazing a pair of metallic structures, one of which comprises an alloy of nickel and copper, which comprises coating the nickel-copper structure with a ferrous metal, welding the ferrous metal to said structure, forming it into a relatively thin elongated ribbon and brazing said ribbon to the other of said structures.

7. The method of brazing Monel metal to a metallic structure, which comprises providing the Monel metal with a ferrous metal coating, welding the coating to the Monel metal, placing the coated Monel metal and said metallic structure in juxtaposition so as to form interstitial spaces between the abutting surfaces, applying copper to the junction of the coated Monel metal and structure, and heating the assembled Monel metal and structure in a reducing atmosphere.

In witnesss whereof I have hereunto set my hand this 14th day of October 1925.

CHRISTIAN STEENSTRUP.